May 9, 1939.  A. D. DAVIES  2,157,748
CINDER POT
Filed Jan. 25, 1939
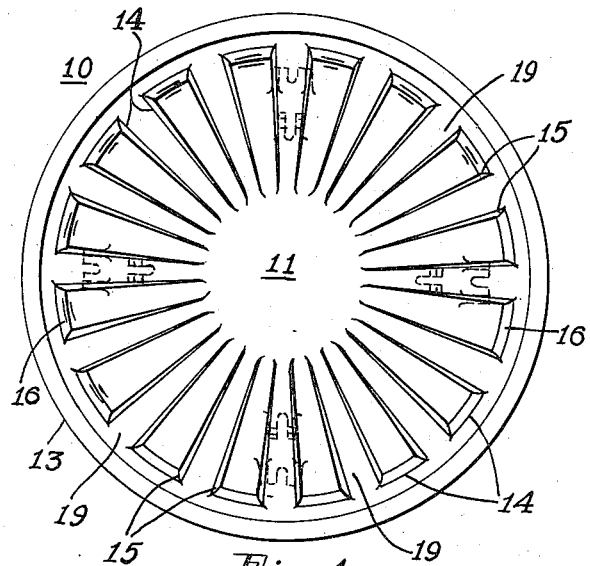
Fig. 1.
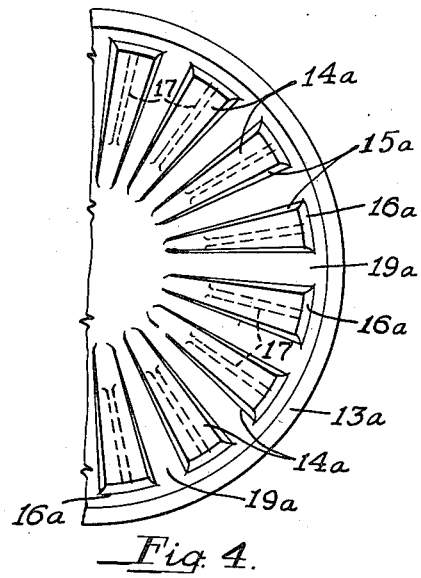
Fig. 4.
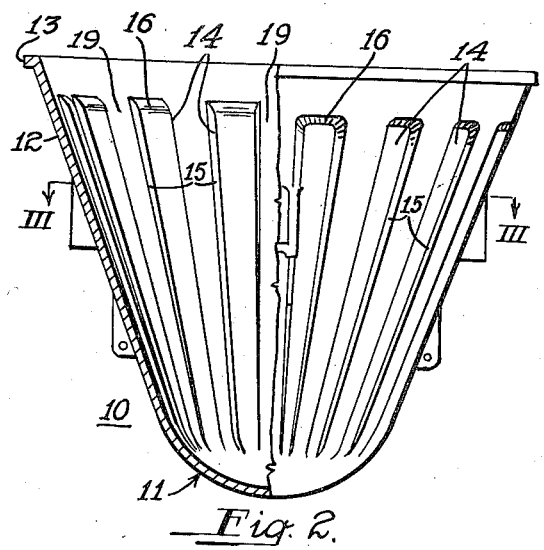
Fig. 2.
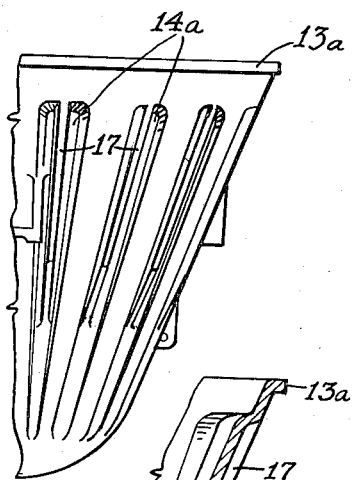
Fig. 5.
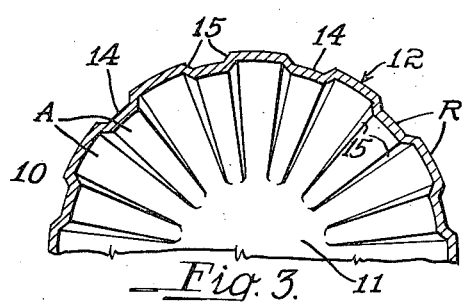
Fig. 3.
Fig. 6.
INVENTOR
Archibald D. Davies
By Green & McCallister
His Attorneys Patented May 9, 1939

2,157,748

UNITED STATES PATENT OFFICE 2,157,748

CINDER POT

Archibald D. Davies, Pittsburgh, Pa.

Application January 25, 1939, Serial No. 252,768

7 Claims. (Cl. 266—39)

My present invention relates to cinder pots for use in handling molten slag, cinder and the like in connection with the operation of blast and open hearth furnaces, the present application being a continuation-in-part of my copending application Serial No. 207,987, filed May 14, 1938.

As explained in my aforesaid copending application, cinder pots of the so-called sinusoidal type are well known and have been rather extensively used. Such pots ordinarily involve vertical flutings or corrugations in the side walls thereof to impart a certain flexibility to the pots.

Cinder pots of such type do not have as long a life as they should have and thus the pots burn out, crack, etc., as well as bulge or become constricted, rendering the pots useless for further service. The fact that these pots have to handle molten material at high temperature and under severe conditions makes it necessary to provide a pot which shall be satisfactorily resistant, economical and long-lived.

One of the most serious causes of shortening the life of prior art pots is the use of the sinusoidal section, usually produced by vertical corrugations or flutings in the pot wall. These corrugations or flutings result in uneven heat distribution, primarily due to the fact that the heat absorbing surfaces of the pot are greater than the heat radiating surfaces. This fundamental fault in prior pots causes alternate longitudinal portions of the pot wall to become much hotter than the intermediate portions. Also due to the fact that the heat is unevenly distributed, portions of the pot stay at a higher temperature for a longer period of time than is either necessary or desirable. As a result the metal of the pot creeps, and this creeping is the result of stresses imposed by the unequal heat distribution and the excessive temperature. Other and further difficulties and disadvantages of prior art pots will be apparent from my aforesaid copending application.

It is, accordingly, one of the objects of the present invention to produce a cinder pot which avoids the difficulties and disadvantages of prior art pots and which, in particular, radiates heat more evenly and rapidly while at the same time reducing the temperature of the pot wall.

Another object of the invention resides in producing a pot the side wall of which is characterized by the presence of a plurality of substantially channel-shaped sections each of which has a flat bottom and the channel sections being connected by inclined legs.

Another object of the invention resides in accomplishing these new and useful results without departing from the prior art idea of utilizing a pot of uniform wall thickness.

A still further object of the invention resides in the production of a cinder pot having the new and useful properties and characteristics herein set forth and which has a uniform thickness of wall throughout but wherein the wall is so contoured as to make the heat absorbing surface thereof not greater than the heat radiating surface thereof, the former being equal to or less than the latter.

A still further object of the invention resides in producing a cinder pot wherein the stresses arising from temperature differentials are greatly decreased, and thus in the production of a pot which does not constrict or distort.

Other and further objects and advantages will be understood by those skilled in the art as will be apparent or pointed out hereinafter.

In the accompanying drawing Figure 1 illustrates in plan view a cinder pot embodying my present invention;

Fig. 2 is a side elevational view of the cinder pot of Fig. 1 with a portion thereof broken away to expose otherwise invisible structure;

Fig. 3 is a half section of the cinder pot of my present invention taken on the line III—III of Fig. 2;

Fig. 4 is a half plan view similar to Fig. 1 of a somewhat modified cinder pot in which each flat-bottomed channel-shaped section is provided with a longitudinal medial rib;

Fig. 5 is a half elevation of the modified cinder pot of Fig. 4; and

Fig. 6 is a fragmentary elevation partly in section taken through Fig. 5 just to the left of one of the ribs thereof.

Referring first to Figs. 1, 2 and 3 of the drawing, the numeral 10 indicates a cinder pot as a whole made of suitable metal such as cast iron and which has a spheroidal bottom portion 11 and an upwardly and outwardly flaring side wall 12. The side wall 12 terminates at its upper extremity in a rim or annular reinforcing ring 13. Intermediate its top and bottom the pot is provided with conventional fittings whereat a bail ring contacts the pot for supporting and transporting purposes.

It will be noted in particular that the side wall 12 is of uniform thickness from top to bottom and circumferentially without sacrificing any desired qualities in the pot. It will further be noted from Fig. 3, in particular, that the sinusoidal form of pot has been abandoned and that I have produced a pot which has a series of substantially flat-bottomed channel-shaped sections 14 spaced circumferentially around the pot and each connected to the adjacent smooth pot wall portion by inclined or beveled leg portions 15 which are generally triangular in shape due to the fact that the channel-shaped sections taper in width from top to bottom and also become shallower from top to bottom as shown. These channel-shaped sections 14 terminate appreciably below the rim 13 of the pot and connect to or merge with the smooth surface of the pot wall somewhat below the rim by means of rounded connecting surfaces 16. At their lower ends the channel-shaped sections merge with the spheroidal bottom of the pot wall, and the lower terminus of each channel-shaped section is below the point of tangency between the wall and the bottom.

In the modified construction of Figs. 4, 5 and 6 I have provided a rib 17 which extends longitudinally with respect to each channel-shaped section 14a. Each such rib is substantially centrally disposed between the left and right-hand extremities of the channel section, but each such rib extends to a point just somewhat below the vertical mid-point of each channel-shaped section, the lower end of the rib tapering rapidly near its lower terminus until it merges with the flat bottom of the channel-shaped section, as clearly shown at 18 in Fig. 6. At its upper terminus each rib 17 merges with the rounded wall surface 16a at the top of each channel-section where the latter connects to the smooth surface of the pot wall somewhat below the rim 13a. It will be noted that in both forms of the invention the extreme bottom of the pot is smooth surfaced and unmarked by irregularities of any sort. The modified pot is, except for ribs 17, the same as the pot of Figs. 1, 2 and 3.

In use, hot cinder, slag, etc., in molten condition are poured into the pot, and due to the fact that the present pot has increased radiating surfaces as compared with sinusoidal or prior art pots, the temperature of the pot even at the hottest portion never becomes as high as in connection with prior art pots, and at the same time the pot and its charge cool more quickly and uniformly. Due to the fact that the pot has a section such as that shown in Fig. 3, the radiating surfaces R of the pot are equal to or greater than the heat absorbing surfaces A of the pot. Moreover, the pot does not heat irregularly as in sinusoidal pots, and hence the resultant stresses introduced into the pot are very materially lowered with the result that creep of the metal becomes exceedingly small and practically negligible in connection with the present pot. Therefore, the pots do not readily constrict, bulge, distort or otherwise deteriorate as compared with known pots. Fire cracking, burning and like effects are greatly retarded or inhibited with the result that pots of the present type have a life several times that of known pots.

Since the creep of metal is a function of the stresses therein and since the stresses are dependent upon pot wall temperature differentials, I have produced a pot having decreased stress and therefore greatly reduced creep with a lower and more uniform pot wall temperature. A substantial reduction of temperature has the effect of materially reducing the stresses in the pot wall, and a reduction in stress of 50%, for example, results in reducing the creep rate to approximately one-tenth of its previous value.

In connection with that form of my invention shown in Figs. 4 to 6 inclusive, the employment of a rib in each flat-bottomed channel-shaped section has the effect of still further increasing the radiating surface, and thus in still further favorably influencing pot wall temperature, stresses and creep. The ribs also serve to strengthen and reinforce the pot at the channel-shaped sections, and therefore the pot is of adequate strength at all points but particularly in the neighborhood of that area of the pot which normally reaches the highest temperature and which is usually at or near the bail line of the pot.

The provision of the rim or annular ring 13 or 13a at the top of the pot serves to increase the life of the pot by strengthening the pot against vertical cracking caused by the overall mechanical distortion of the top of the pot arising from the sudden starting and stopping of the railroad shifting engine. Also in connection with my present pot, no interference with emptying results from the present construction even when a solidified skin or shell has formed adjacent the inner wall of the pot. In this connection, I call attention to the fact that the base or bottom of each channel section on the inside of the pot is of less width than the overall distance between the legs 15 or 15a of such sections, thus forming the recesses 19 or 19a which are wider near the mouth of the pot than they are at the bottom thereof, thus actually facilitating emptying.

A pot in accordance with either form of the present invention is vastly superior to pots hitherto used, and the present pot is characterized by a wall which, while of uniform thickness from top to bottom, does not have those disadvantageous results accepted as a necessary evil in connection with prior art pots. The present pot is not only economical in use but it has a much longer life, and that life is trouble-free. The increase of radiating surface, in addition to the results heretofore specified, also aids materially in lengthening the life of the pot due to the decrease in effective temperature.

The foregoing is intended as illustrative and not as limitative, and it is to be understood that other modifications, additions, omissions and substitutions may be made without departing from the spirit and scope of the invention which is rather to be defined by the appended claims.

Having thus described my invention, what I claim as new and desire to secure by Letters Patent is:

1. A cinder pot for receiving molten slag and the like having a closed spheroidal bottom and an upwardly and outwardly flaring side wall, the said side wall being of uniform thickness from top to bottom and being provided with a series of circumferentially spaced tapered substantially flat-bottomed channel-shaped sections provided with legs connecting adjacent sections together.

2. A cinder pot for receiving molten slag and the like having a closed spheroidal bottom and an upwardly and outwardly flaring side wall, the said side wall being of uniform thickness from top to bottom and being provided with a series of circumferentially spaced tapered substantially flat-bottomed channel-shaped sections provided with legs connecting adjacent sections together, the said channel-shaped sections terminating below the point of tangency between said wall and said spheroidal bottom.

3. A cinder pot for receiving molten slag and the like having a closed spheroidal bottom and an upwardly and outwardly flaring side wall, the said side wall being of uniform thickness from top to bottom and being provided with a series of circumferentially spaced tapered substantially flat-bottomed channel-shaped sections provided with legs connecting adjacent sections together, the said pot being characterized by having a heat absorbing surface not greater than its heat radiating surface.

4. A cinder pot for receiving molten slag and the like having a closed spheroidal bottom and an upwardly and outwardly flaring side wall, the said side wall being of uniform thickness from top to bottom and being provided with a series of circumferentially spaced tapered substantially flat-bottomed channel-shaped sections provided with legs connecting adjacent sections together, each such channel-shaped section being provided with a longitudinally disposed rib extending from the upper terminus of such section to a point short of the lower terminus thereof.

5. A cinder pot for receiving molten slag and the like having a closed spheroidal bottom and an upwardly and outwardly flaring side wall, the said side wall being of uniform thickness from top to bottom and being provided with a series of circumferentially spaced tapered substantially flat-bottomed channel-shaped sections provided with legs connecting adjacent sections together, each such channel-shaped section being provided with a longitudinally disposed rib extending from the upper terminus of such section to a point short of the lower terminus thereof, and each such rib located intermediate the lateral extremities of each channel-shaped section and merging with the bottom of such section at a point somewhat below the vertical mid-point of the section.

6. A cinder pot for receiving molten slag and the like having a closed spheroidal bottom and an upwardly and outwardly flaring side wall, the said side wall being provided with a series of circumferentially spaced tapered substantially flat-bottomed channel-shaped sections provided with legs connecting adjacent sections together, each such channel-shaped section terminating appreciably below the upper extremity of the side wall and merging with the same via a curved surface.

7. A cinder pot for receiving molten slag and the like having a closed spheroidal bottom and an upwardly and outwardly flaring side wall which is provided with a series of circumferentially spaced substantially flat-bottomed channel-shaped sections of less length than the height of the side wall and wherein each such channel-shaped section terminates appreciably below the upper extremity of the pot wall and merges therewith via a curved surface, the inner surface of the pot being characterized by the presence of spaced recesses which increase in width toward the mouth of the pot to facilitate emptying the contents of the pot.

ARCHIBALD D. DAVIES.